C. G. & W. H. EMERY.
CIGARETTE MACHINE.
No. 420,869. Patented Feb. 4, 1890.
FIG. VI.
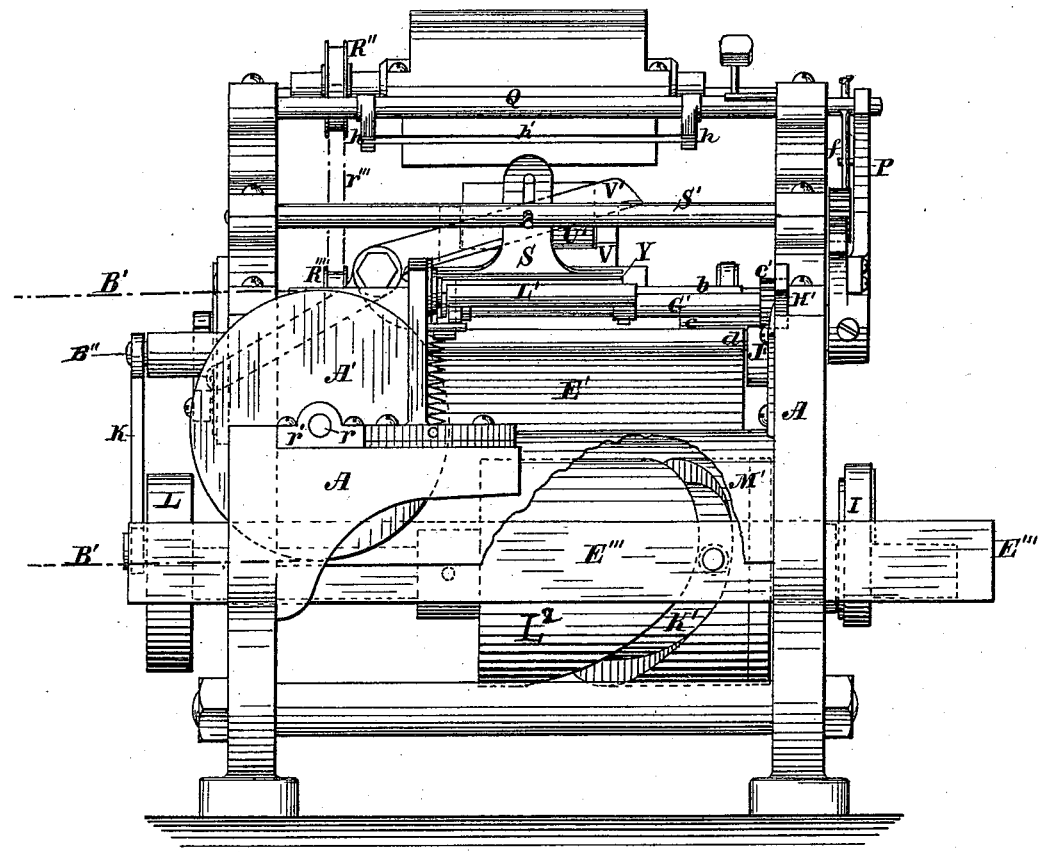
FIG. VII.
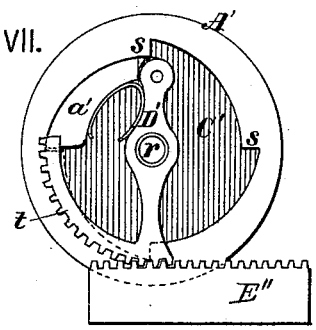
FIG. VIII.
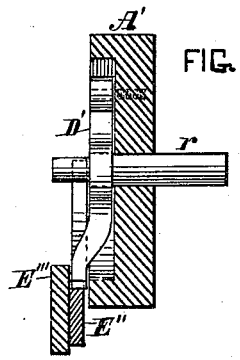
WITNESSES:
J. A. Rutherford
J. H. Kaiser
INVENTORS:
Charles G. Emery,
William H. Emery,
By James L. Norris.
Attorney.

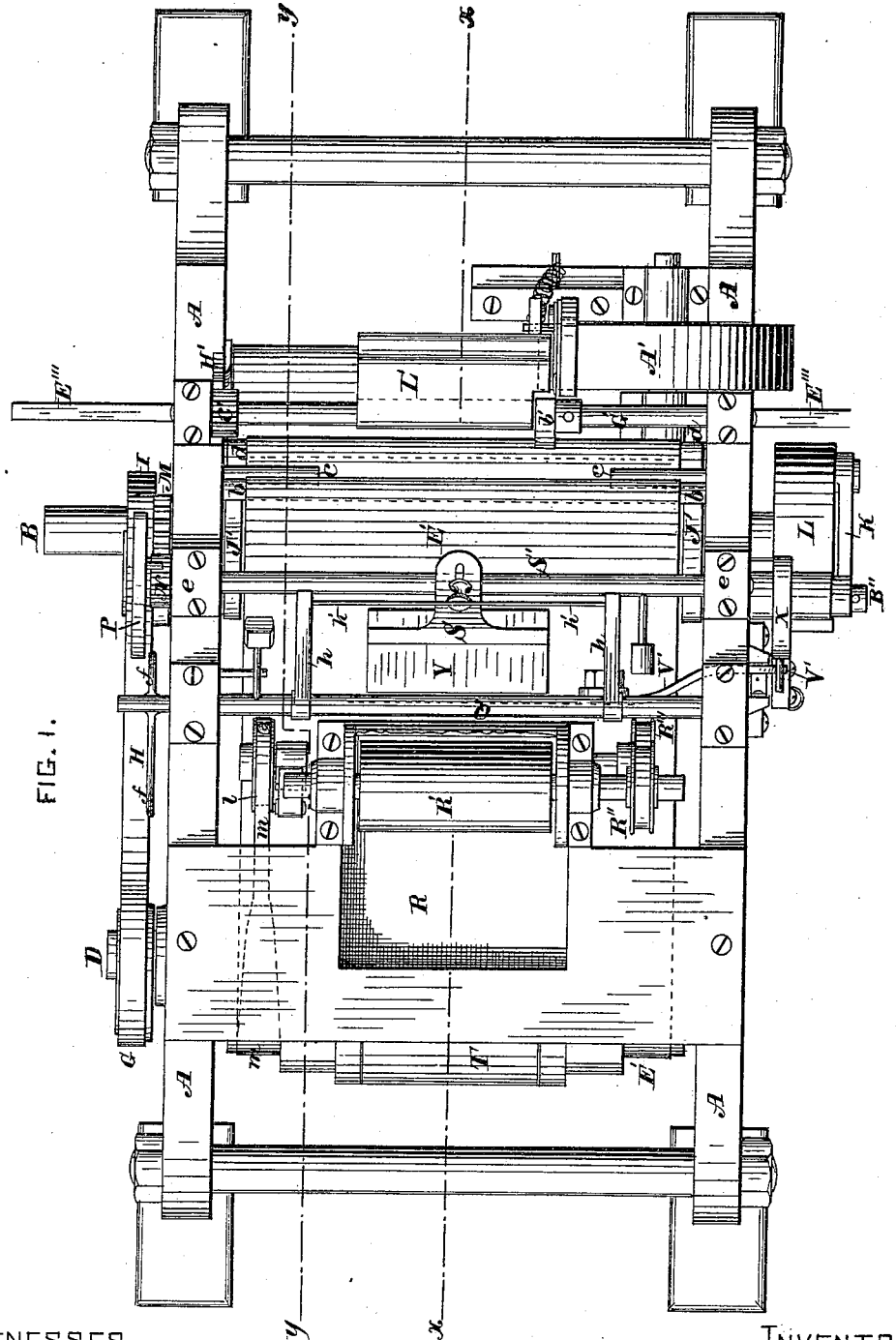

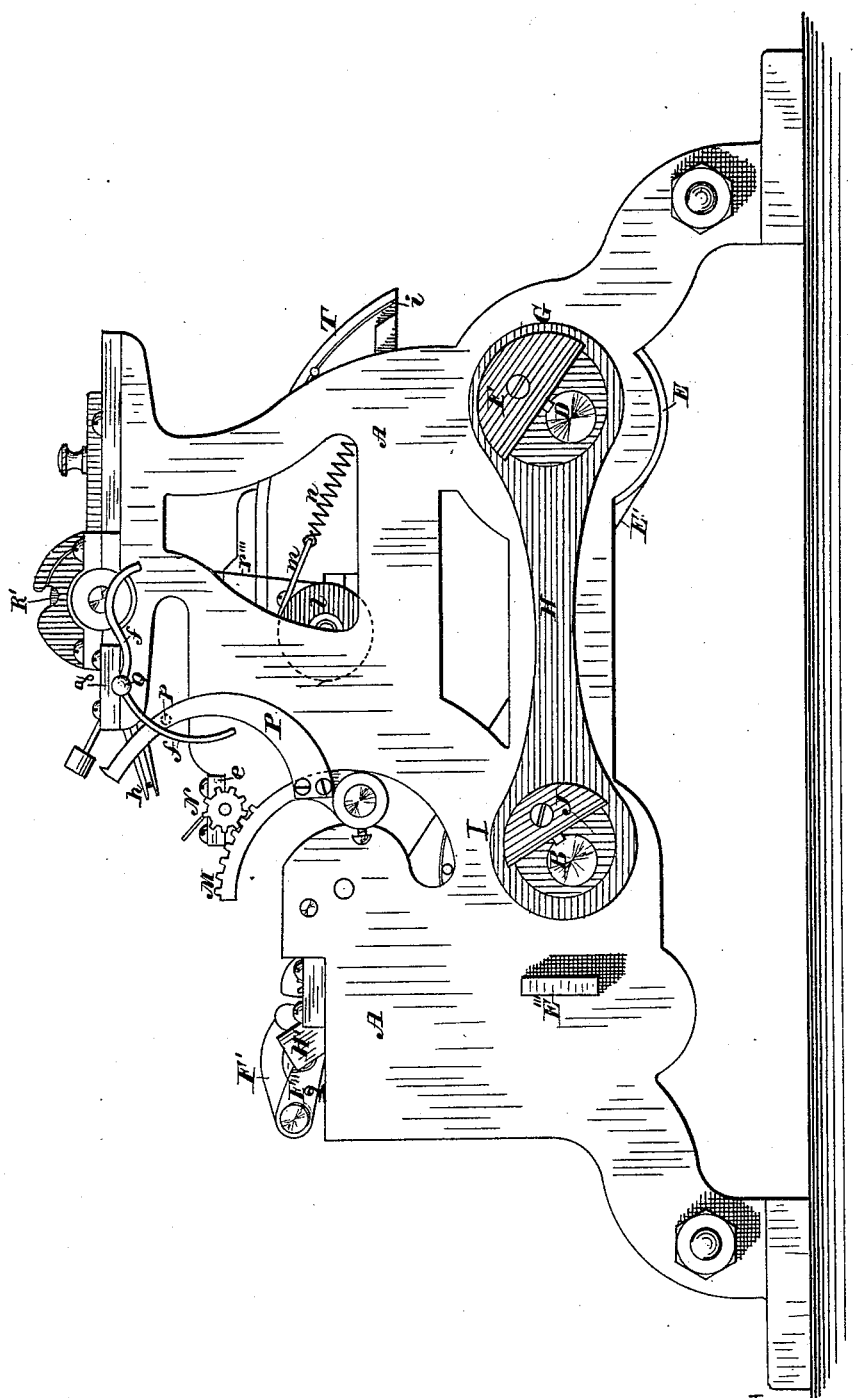

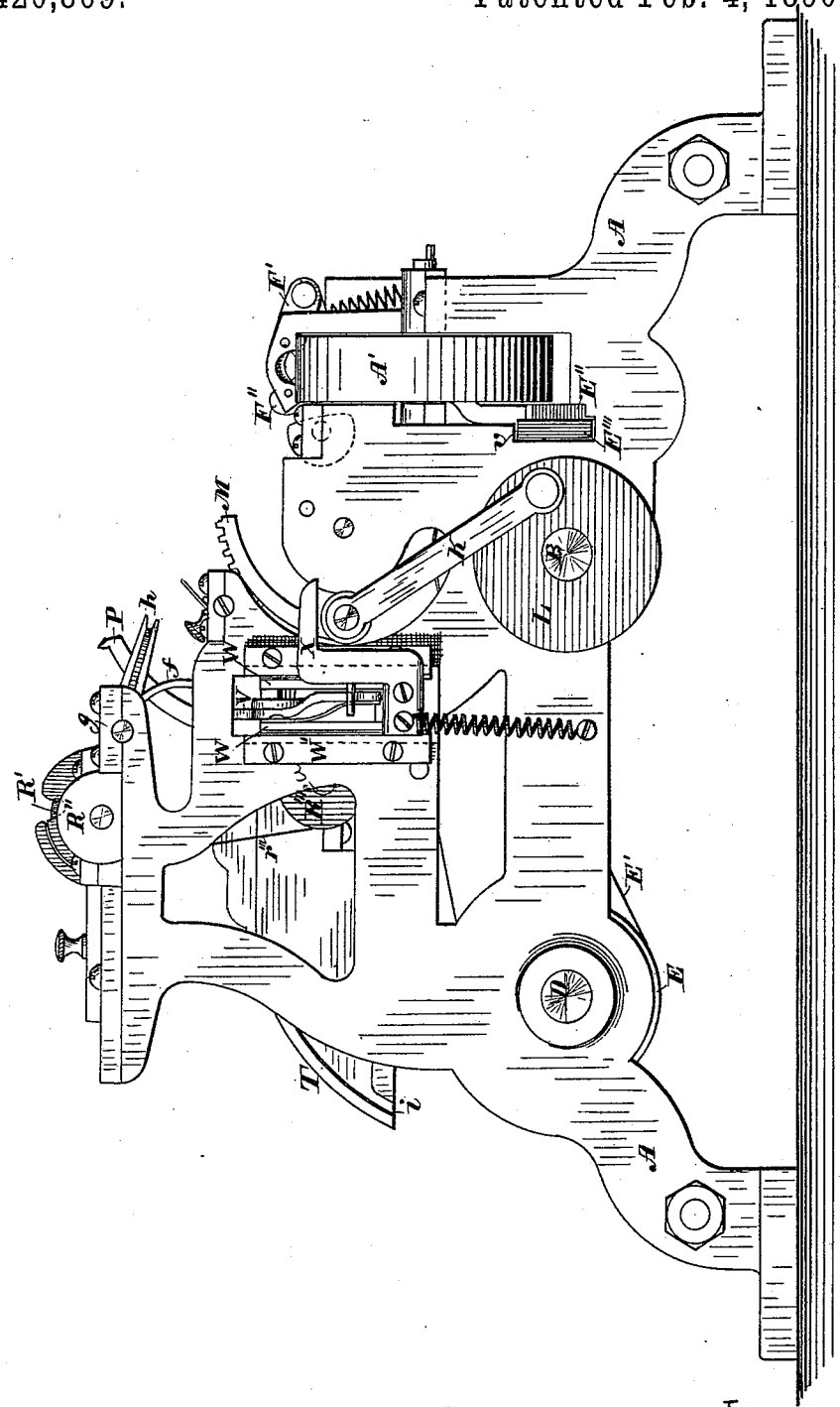

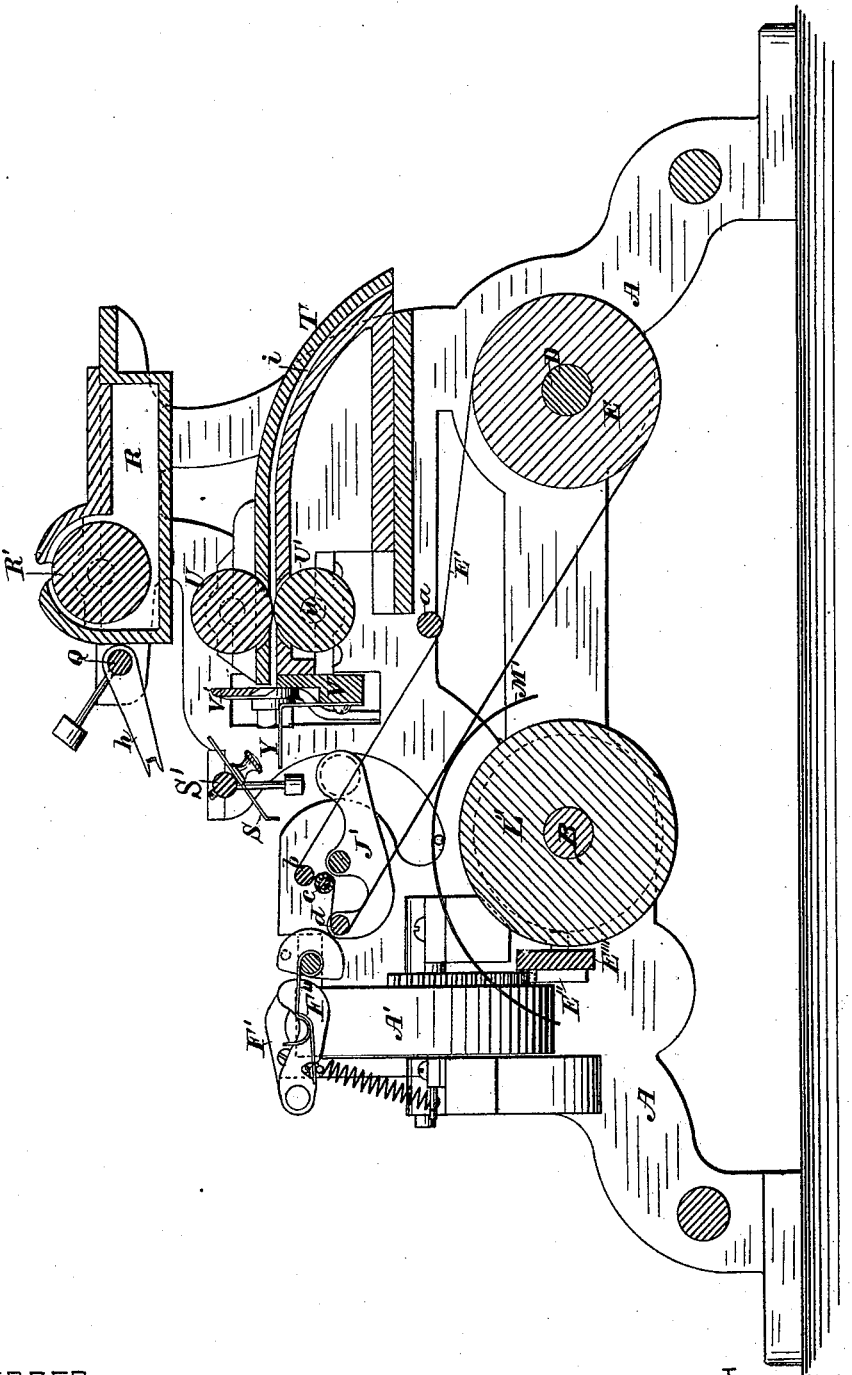

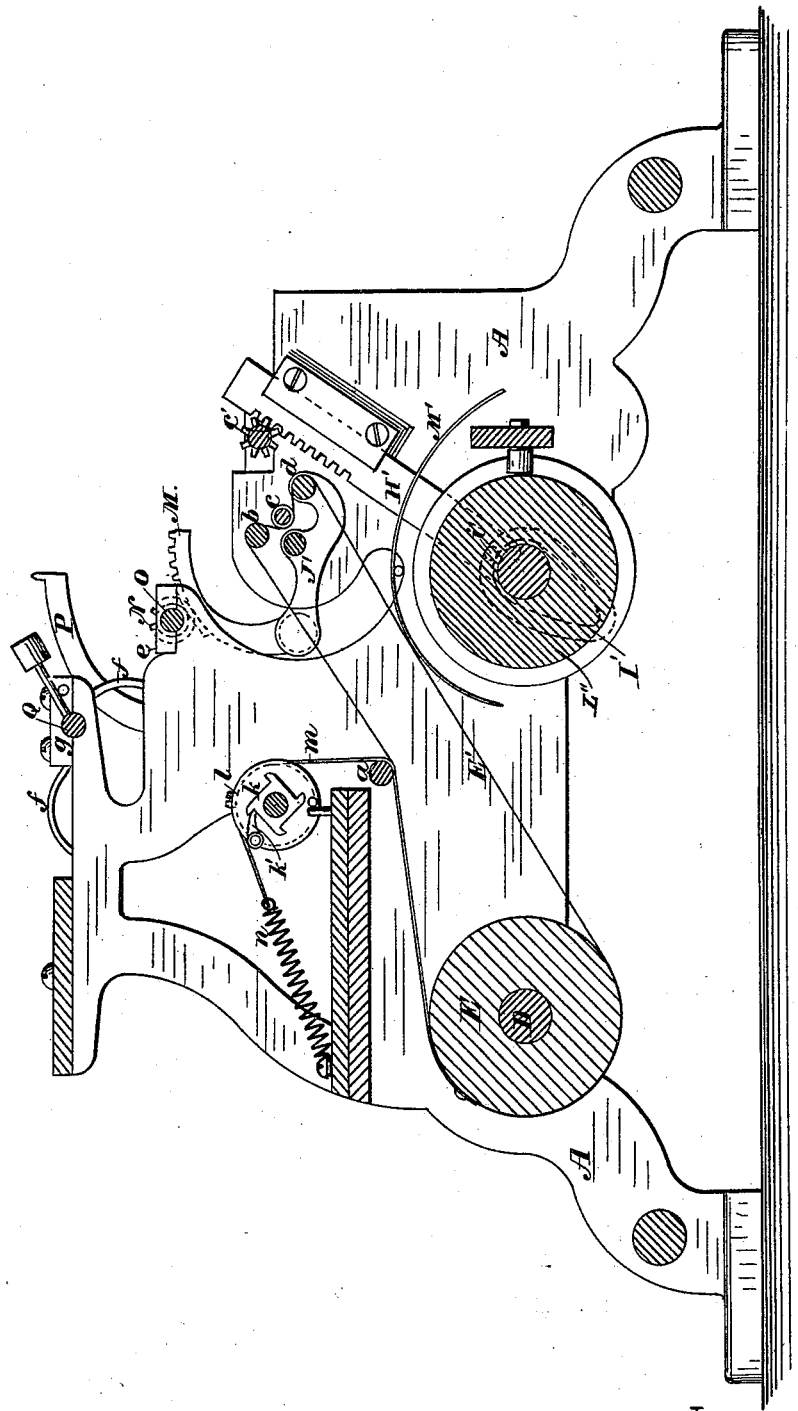

C. G. & W. H. EMERY.
CIGARETTE MACHINE.
No. 420,869.  
Patented Feb. 4, 1890.
7 Sheets—Sheet 7.
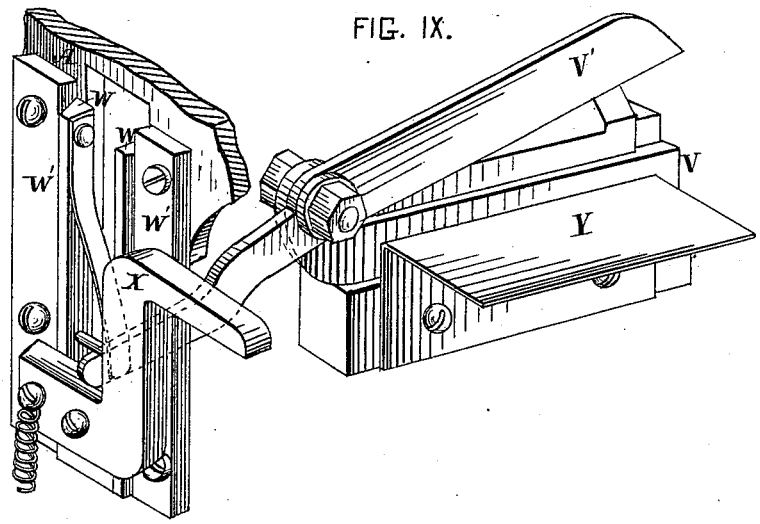
FIG. IX.
FIG. X.
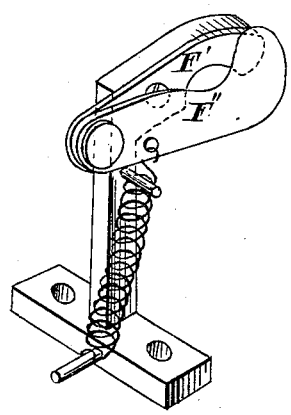
FIG. XI.
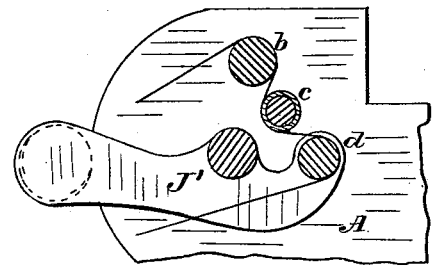
FIG. XII.
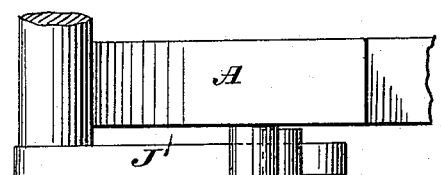
FIG. XIII.
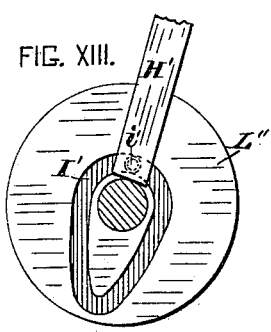
WITNESSES:
J. A. Rutherford
J. H. Kaiser
INVENTORS
Charles G. Emery
William H. Emery,
By James L. Norris
Attorney.

UNITED STATES PATENT OFFICE.

CHARLES GOODWIN EMERY AND WILLIAM HANSON EMERY, OF BROOKLYN, NEW YORK, ASSIGNOR, BY MESNE ASSIGNMENTS, TO THE BONSACK MACHINE COMPANY, OF SALEM, VIRGINIA.

CIGARETTE-MACHINE.

SPECIFICATION forming part of Letters Patent No. 420,869, dated February 4, 1890.

Application filed May 9, 1879.

*To all whom it may concern:*

Be it known that we, CHARLES GOODWIN EMERY and WILLIAM HANSON EMERY, of Brooklyn, in the county of Kings and State of New York, have invented certain new and useful Improvements in Cigarette-Machines, of which the following is a specification.

This invention has for its object to produce a machine for making cigarettes in which the filler will be cut into proper lengths and fed into the machine, the paper cut into suitable widths, and a proper amount of paste applied to one edge, and the paper then wrapped around the filler and its edges united, the operations of the devices by which these objects are effected being entirely automatic.

In the drawings, Figure I represents a top view of the machine with the cover of the paste-receptacle removed. Fig. II represents a side elevation of the machine, showing the mechanism for imparting motion to the working parts of the same. Fig. III represents an elevation of the opposite side of the machine, showing the mechanism for operating the devices for cutting the paper and the drum and mechanism for feeding the filler to the machine. Fig. IV represents a longitudinal central vertical section on the line $x\, x$, Fig. I, through the machine. Fig. V represents a longitudinal vertical section on line $y\, y$, Fig. I, showing the wrapping-belt drum, the wrapping-belt secured thereto, the wrapping-rollers for rolling the belt around the filler and wrapper, the driving-shaft and the drum mounted thereon, mechanism for operating the shaft carrying the filler feeding and cutting mechanism, and also the ratchet for operating the paper-feed drums. Fig. VI represents a front elevation of the machine, showing the various parts, the shield or guide by which the finished cigarettes are discharged being broken away to show the cam-groove in the drum by which the horizontal reciprocating bar for actuating the filler-feed devices is operated. Fig. VII represents an inside view of the drum which carries the filler-feed belt, showing the clutch mechanism by means of which said drum is driven. Fig. VIII represents a vertical central section of said drum, showing also the clutch mechanism. Fig. IX is a detached perspective view of the paper-cutting devices and the platform for supporting the paper while being pasted. Fig. X is a detached perspective view of the knife or shears for cutting the filler. Fig. XI is a detail sectional view of the wrapping-belt and its guiding-rollers. Fig. XII is a top view of the same. Fig. XIII is a detached view of the cam for operating the bar actuating the filler-cutting knife or shear and for throwing the filler upon the wrapping-belt.

Referring to the drawings, the letter A indicates a strong frame of metal or other suitable material, which carries and supports the working parts of our machine.

B indicates the driving-shaft journaled in bearings in opposite sides of the frame A, and which may be provided at one end with a crank or belt pulley, or suitable gearing, by means of which motion may be imparted to it.

The letter D indicates a rock-shaft journaled in bearings in the frame, upon which is mounted a drum E. Said rock-shaft is provided at one end with an eccentric F, around which passes an eccentric-strap G, attached to one end of a link H, which is provided at its opposite end with a similar eccentric-strap I, fitting around an eccentric J on the driving-shaft B, so that when said driving-shaft is rotated a rocking or oscillating motion will be imparted to the shaft D and the drum E, which it carries. To the drum E is secured an endless wrapping-belt E′, which extends upward and forward under and against a roller $a$, extending transversely across the machine and journaled in bearings at opposite sides of the same, then over a roller $b$, and under two short rollers $c$, journaled on studs projecting inward from opposite sides of the machine, and around a roller $d$, journaled between oscillating arms J′, pivoted to the sides of the machine and operated by means of a link K, connected to the arms J′ by stud B″, secured to a crank-pin on the wheel L, mounted on one end of the driving-shaft in such manner as to fold the belt at proper intervals over the rollers $c$ and the filler and roll the filler therein and encircle it with the wrapper, as more fully hereinafter specified.

The short rollers serve to regulate the size of the cigarette by forming a belt-pocket of uniform size between the ends of the rollers to receive the tobacco and enable any number of cigarettes precisely alike in size and finish to be made, and said rollers may be made interchangeable and of different sizes, so that the size of cigarette may be varied, if desired. Heretofore the size of the cigarette has been determined, in some cases, by the amount of tobacco used, which is apt to vary, rendering the cigarettes very irregular and impairing their finish.

To one of the oscillating arms J' is secured a toothed segment M, which intermeshes with a pinion N, secured to one end of a rock-shaft O, journaled in bearings e at opposite sides of the machine. The said toothed segment has attached to it a plain segment P, which is provided with a pin p, which alternately strikes the arms f on a rock-shaft Q, journaled in bearings g in the frame of the machine, and imparts to said shaft an oscillating motion. Said shaft Q extends transversely in front of a paste-receptacle R, mounted upon the top of the machine, and is provided with two arms h, carrying a paste-distributer h', which may be rigid or elastic, but is preferably an elastic strap connecting the outer ends of the arms, and which is adapted to be thrown in contact with a drum R', which is mounted in the paste-receptacle R and caused to rotate therein by suitable mechanism, the distributer serving to take up the paste and convey it to the edge of the plate S, mounted on the rock-shaft S', which supplies it to the edge of the paper which forms the wrapper, and serves to convey the paper to the wrapping-belt, as more fully hereinafter specified.

The letter T indicates the paper-feeding device, consisting of a guide formed of suitable material in two parts with a passage i of a width equal to the length of the finished cigarette between them, through which the paper is carried in a continuous sheet and fed to the machine. Near the forward ends of said guide in the respective parts are mounted the feed-rollers U U'. The roller U' is mounted on a shaft u, which is provided with a ratchet k, which is operated by means of a pawl k', pivoted to the face of the wheel l, rotating loosely on the shaft u, and connected with the wrapping-belt by means of a strap m and driven in one direction thereby and in the opposite direction by its connection with a spring n. Through this strap an intermittent rotary motion is imparted from the wrapping-belt drum to said feed-rolls, serving to carry the paper forward in proper widths and at proper intervals for the formation of each cigarette. The end of shaft u opposite to that carrying the ratchet k is provided with a belt-pulley R''', around which passes a belt r''', passing also around a similar pulley R'' on the projecting shaft of the paste-roller R', and through this belt and pulleys the proper step-by-step rotary motion is given to said paste-roller, in order that it shall present a fresh surface each time the paste-distributer comes in contact with it. The forward end of the lower part of said guide T is provided with a stationary knife V, and an oscillating knife V' is pivoted to said stationary knife and operated by means of a vertically-sliding frame W, traveling in ways W' at one side of the machine, the said frame being lifted by a stud B'', projecting from the oscillating arm J' and connecting this arm to link K, which strikes under an arm X on said frame, causing the knives to cut the paper in uniform lengths at proper intervals to be supplied to the wrapping-belt. After being moved upward to strike the tail of the oscillating or pivoted knife, the frame W is drawn down again by a suitable spring, and a pin projecting from the frame strikes the upper edge of the tail of the knife, causing the blade to rise. Immediately in front of the guide is a table Y, upon which the paper is delivered when cut or separated from the continuous roll, and upon which it is retained until its edge is supplied with the requisite quantity of paste. The paste is applied to one edge of the wrapper, and the wrapper is transferred to the wrapping-belt by means of the plate S, attached to the rock-shaft S'. This plate at proper intervals receives the paste, as hereinbefore described, and is carried over upon the edge of the wrapper, coating its edge with paste, and on its return movement, by the adhesion of the paste, carries the wrapper to the wrapping-belt, where it is wrapped around the filler. As the plate S, with the wrapper adhesively attached, is rocked back on its return-movement, the free edge of the wrapper is brought in contact with the filler in its position between the ends of the short rollers c, and the oscillating roller d is carried up by the movement of the arms J' to bite this edge of the wrapper between the roller d and the filler. The movement of the wrapping-belt E', when the parts are in the position above described, draws the wrapper from the plate S and rolls it around the filler, the filler at the same time being rolled with the wrapper, and the wrapper is thus caused to completely encircle the filler, and its edges are overlapped and cemented together.

The plate S is adjustably attached to the rock-shaft by a thumb-screw passing through a slot in the said plate, and the said rock-shaft may have a projecting arm carrying at its end a weight, which causes the plate S to bear upon the paper on the table Y with proper force to surely deliver the paste to the margin of said paper. The shaft carrying the paste-distributer may also be so weighted that the said distributer will be pressed upon the drum R', in order to insure its taking sufficient paste therefrom. The filler may be supplied to the wrapping-belt by any suitable means. In the present instance we have designed and shown automatically-operating mechanism for the purpose. Referring to this part of our invention, (see Fig. VI,) the letter A' indicates a drum, to which an intermittent rotary motion is imparted, and which is provided with an endless belt B', (shown in dotted lines,) whereby a continuous filler is carried forward and cut and delivered in suitable lengths automatically to the wrapping-belt. The said drum A' is mounted upon a suitable shaft r, journaled in bearings r' in the frame A, and is provided on one side with a recess C' and a series of abutments s. In said recess is pivoted a lever D', having a toothed segment t at one end engaging a reciprocating rack-bar E'', adapted to slide in ways v at opposite sides of the machine. The other end of said lever has pivoted to it a pawl a', which is held in a normal position by means of a suitable spring, so as to engage the abutments successively when the rack is moved in one direction, and carry said drum and slip past the abutments when the rack is moved in the opposite direction, so as to give the drum proper intermittent motion necessary to feed the filler in proper lengths. From the said drum the filler is fed forward between a stationary knife F' and oscillating knife F'', the latter being operated for cutting by means of a cam b' on a rock-shaft G', which receives motion through the medium of a sliding rack H', working in suitable ways formed in the frame of the machine, and a pinion c', with which said rack engages, the rack being operated by means of a pin i', projecting into a cam-groove I' in the end of a drum $L^2$ on the driving-shaft. After the knife F'' has cut the filler it is drawn back for another cut by a suitable spring. The sliding bar E''', carrying the rack E'', receives its motion through the medium of a pin working in a cam-groove K' in the periphery of a drum $L^2$. To the rock-shaft G' is loosely secured a plate L', having a trough for the reception of the filler, said plate being adapted to receive the filler and carry and deliver the same to the folded portions of the belt, by which the wrapper is applied. The relative arrangement of the plate L' and its trough with the rock-shaft G' and the filler-cutters is such that the plate L' remains stationary, while the cutters operate to cut the filler, and is then engaged with the rock-shaft and is carried over to deliver the severed filler upon the wrapping-belt.

The letter M' indicates a combined guard or shield extending over the driving-shaft and below the forming-rollers, which performs the double function of protecting the cam on the drum $L^2$, attached to the driving-shaft, from dropping tobacco, and also to guide and discharge the cigarettes from the wrapping-belt and forming-rollers when completed.

The operation of our machine will be readily understood in connection with the above description. Upon imparting a rotary motion to the driving-shaft an oscillating or rocking motion will be imparted through the link and eccentrics to the rock-shaft carrying the wrapping-belt drum, causing said belt to travel back and forth over the stationary and oscillating rollers, giving a rolling motion to the filler, which is fed either by hand or by an automatic mechanism. In the meantime the paper is fed forward through the guide and a suitable portion cut off to form a wrapper for a cigarette, to one edge of which the paste is supplied by means of the plate on the rock-shaft S', the said plate serving also to convey the paper to that portion of the wrapping-belt surrounding the wrapping-rollers, whereby it is wrapped around the filler and its edges cemented together.

We propose to use for wrapping our cigarettes a slip of paper having the name of the brand, a trade-mark, or other inscription printed or embossed thereupon at such intervals that each single wrapper as cut off will have the same upon it; or the said name or other representation may be formed in water-lines when the paper is manufactured.

What we claim is—

1. In a cigarette-machine, the combination, substantially as set forth, of a wrapping-belt, mechanism for operating the same, a wrapper-transferring device operating independently of the paper-feeding device and provided with means for engaging with or taking hold of the wrapper at its source of supply, and mechanism for operating said wrapper-transferring device, whereby a wrapper is taken from its source of supply, transferred, and delivered to the wrapping-belt in position to be wrapped around a cigarette-filler.

2. In a cigarette-machine, the combination, substantially as set forth, of a wrapping-belt, mechanism for operating the same, a rock-shaft provided with means for engaging a wrapper, and mechanism for operating the rock-shaft, whereby the wrapper is taken from its source of supply and delivered to the wrapping-belt in position to be wrapped around a cigarette-filler.

3. In a cigarette-machine, the combination, substantially as set forth, of a wrapping-belt, mechanism for operating the same, a wrapper-transferring device independent of the paper-feeding device, mechanism for operating said independent device, and suitable mechanism for automatically feeding the paper, cutting it into proper wrapper widths, and applying paste thereto, whereby the wrapper is taken from a continuous roll, cut into proper widths, supplied with a suitable quantity of paste, and is then taken and delivered by the said independent device to the wrapping-belt in position to be wrapped around a cigarette-filler.

4. In a cigarette-machine, the combination, substantially as set forth, of a wrapping-belt, mechanism for operating the same, and short rollers arranged at or near each edge of the wrapping-belt, around which the wrapping-belt passes to form a pocket between the ends of said rollers, whereby cigarettes are rolled of a uniform size independent of varying quantities of tobacco supplied.

5. In a cigarette-machine, the combination, substantially as set forth, of a wrapping-belt, mechanism for operating the same, and short interchangeable rollers arranged at or near each edge of the wrapping-belt, around which the wrapping-belt passes to form a pocket between the ends of said rollers, whereby the size of the cigarette is regulated by the size of the interchangeable rollers.

6. In a cigarette-machine, the combination, substantially as set forth, of a wrapping-belt, a rock-shaft operated by suitable mechanism for moving the wrapping-belt, stationary and oscillating rollers over which said belt passes, and short rollers around which the belt is folded to form a pocket between the ends of such short rollers by the action of the movable and stationary rollers, whereby cigarettes are rolled to a uniform size between the ends of the short rollers.

7. In combination with the wrapping-belt and its rollers, a rock-shaft operated by suitable mechanism and provided with a paste-applying plate, whereby a uniform amount of paste is applied to the edge of the wrapper and the wrapper is delivered to the wrapping-belt, substantially as specified.

8. In combination with the wrapping-belt and its rollers, a plate mounted on a rock-shaft and provided with a trough to receive a filler, and mechanism for operating said shaft to rock said plate and deliver the filler to the wrapping-belt, substantially as specified.

9. In combination with the paste-supplying plate and a paste-receptacle, a paste-distributer mounted on a rock-shaft, and suitable operating mechanism whereby the paste is conveyed from a paste-roll and evenly distributed to the supplying-plate, substantially as specified.

10. In combination with the paste-receptacle and paste-roller arranged to revolve therein and the paste-applying plate, the paste-distributing device having an elastic or yielding distributer adapted to receive the paste from the roller and convey it to the paste-applying plate, substantially as specified.

11. The combination of a wrapping-belt, a belt-carrying drum, stationary and oscillating belt-rollers, short rollers around which the belt is folded by the action of said stationary and oscillating rollers, thereby giving a rolling motion to the filler, mechanism for feeding the filler and wrapper and for cutting off the wrapper, a paste-applying plate, and a yielding paste-distributer, substantially as specified.

12. In a cigarette-machine, the combination, substantially as set forth, of a wrapping-belt, mechanism for operating the same, and wrapper pasting and transferring mechanism adapted to engage the wrapper through the medium of a paste or adhesive material used to secure the overlapped edges of the wrapper when the filler is inclosed therein, whereby the wrapper is taken from the source of supply and delivered to the wrapping-belt in position to be wrapped around the filler.

In testimony that we claim the foregoing we have hereunto set our hands in the presence of the subscribing witnesses.

CHARLES GOODWIN EMERY.
WILLIAM HANSON EMERY.

Witnesses to the signature of Charles Goodwin Emery:
JOHN D. LITTLE,
HENRY HENJES.

Witnesses to the signature of Willian Hanson Emery:
JAMES L. NORRIS,
J. A. RUTHERFORD.